(12) United States Patent
Tichborne et al.

(10) Patent No.: US 9,921,095 B2
(45) Date of Patent: Mar. 20, 2018

(54) CAPACITIVE LIQUID LEVEL SENSOR

(71) Applicant: AIRBUS OPERATIONS LIMITED, Bristol (GB)

(72) Inventors: Franklin Tichborne, Bristol (GB); Joseph K-W Lam, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 69 days.

(21) Appl. No.: 14/526,953

(22) Filed: Oct. 29, 2014

(65) Prior Publication Data

US 2015/0114506 A1    Apr. 30, 2015

(30) Foreign Application Priority Data

Oct. 30, 2013 (GB) .................................. 1319153.1

(51) Int. Cl.
*G01F 23/26* (2006.01)
*H01G 11/36* (2013.01)

(52) U.S. Cl.
CPC .......... *G01F 23/266* (2013.01); *G01F 23/263* (2013.01); *G01F 23/268* (2013.01); *H01G 11/36* (2013.01); *Y10T 137/6855* (2015.04)

(58) Field of Classification Search
CPC .. G01F 23/26; G01F 23/2963; G01F 23/2966; G01F 23/2628; G01F 23/266; G01F 23/263; G01F 23/31; G01F 23/268; G01N 21/31; H01G 11/36; H01G 9/155; H01G 9/145; Y10T 137/6855
USPC .......................................................... 73/304
See application file for complete search history.

(56) References Cited

U.S. PATENT DOCUMENTS

| | | | | |
|---|---|---|---|---|
| 5,627,380 | A * | 5/1997 | Crowne | G01F 23/0061 250/577 |
| 5,723,870 | A * | 3/1998 | Crowne | B64D 37/00 250/221 |
| 6,101,873 | A | 8/2000 | Kawakatsu et al. | |
| 6,490,920 | B1 | 12/2002 | Netzer | |
| 2007/0092432 | A1* | 4/2007 | Prud'Homme | C01B 31/043 423/448 |

(Continued)

FOREIGN PATENT DOCUMENTS

WO    2010/139974 A1    12/2010
WO    2010138965 A1    12/2010

(Continued)

OTHER PUBLICATIONS

European Application No. 14190539, Extended European Search Report dated Dec. 3, 2014.

(Continued)

*Primary Examiner* — Natalie Huls
*Assistant Examiner* — Monica S Young
(74) *Attorney, Agent, or Firm* — Hauptman Ham, LLP (57) ABSTRACT

A sensor for measuring a level of a liquid such as fuel and/or water in a tank such as a fuel tank. The sensor includes a stack of capacitors, each capacitor with one or more graphene measurement electrodes and one or more graphene reference electrodes. A measurement system is arranged to measure a capacitance of each capacitor between its measurement electrode(s) and its reference electrode(s) and thereby infer the liquid level. The graphene measurement and reference electrodes are formed in a single layer of graphene oxide by reductive etching.

18 Claims, 7 Drawing Sheets

(56) References Cited

U.S. PATENT DOCUMENTS

| | | | | |
|---|---|---|---|---|
| 2011/0113878 A1* | 5/2011 | Ohshima | G01F 23/266 | 73/304 C |
| 2012/0065904 A1* | 3/2012 | Tichborne | G01F 23/266 | 702/55 |
| 2012/0170171 A1* | 7/2012 | Lee | H01G 11/36 | 361/502 |
| 2013/0045418 A1 | 2/2013 | Oguni et al. | | |
| 2013/0166175 A1 | 6/2013 | Kato | | |
| 2013/0182373 A1* | 7/2013 | Yu | H01G 11/26 | 361/502 |
| 2013/0209991 A1* | 8/2013 | Wang | A61B 5/1473 | 435/5 |
| 2013/0266858 A1* | 10/2013 | Inoue | H01G 11/50 | 429/211 |
| 2013/0269421 A1 | 10/2013 | Tichborne et al. | | |
| 2013/0271811 A1* | 10/2013 | Lam | E06B 9/24 | 359/266 |
| 2014/0152323 A1* | 6/2014 | Kumar | G01F 23/00 | 324/658 |
| 2014/0352801 A1* | 12/2014 | McAlister | B60K 15/035 | 137/312 |
| 2016/0011100 A1* | 1/2016 | Cipullo | G01N 33/28 | 356/436 |
| 2016/0041022 A1* | 2/2016 | Caplan | G01F 23/26 | 73/290 V |
| 2016/0054165 A1* | 2/2016 | Huang | G01F 23/26 | 73/290 R |
| 2016/0134327 A1* | 5/2016 | Joshi | H04B 1/707 | 375/146 |

FOREIGN PATENT DOCUMENTS

| | | |
|---|---|---|
| WO | 2012/114208 A1 | 8/2012 |
| WO | 2013047630 A1 | 4/2013 |

OTHER PUBLICATIONS

UKIPO Search Report dated Dec. 12, 2013 in GB Application No. 1319153.1.

Wei, Zhongqing et al., "Nanoscale Tunable Reduction of Graphene Oxide for Graphene Electronics", Science vol. 328 Jun. 11, 2010, pp. 1373-1376.

EP Examination Report dated Feb. 22, 2017 EP Application No. 14 190 539.8.

* cited by examiner

CAPACITIVE LIQUID LEVEL SENSOR

RELATED APPLICATIONS

The present application claims priority from Great Britain Application Number 1319153.1, filed, Oct. 30, 2013, the disclosure of which is hereby incorporated by reference herein in its entirety.

FIELD OF THE INVENTION

The invention relates to a capacitive sensor for measuring a level of a liquid, and a method of manufacturing such a sensor.

BACKGROUND OF THE INVENTION

A fuel level probe with a series of stacked capacitors is described in US-A-2012/0065904. In one embodiment (FIG. 2) the electrodes are annular and in other embodiments (FIGS. 6A and 6B) the electrodes are planar. The capacitance of each of the capacitive sections is measured sequentially and then used to infer the level of fuel and/or water in an aircraft fuel tank.

SUMMARY OF THE INVENTION

A first aspect of the invention provides a sensor for measuring a level of a liquid. The sensor comprises a stack of capacitors, each capacitor comprising one or more graphene measurement electrodes. The stack is typically oriented vertically when in use. A measurement system is arranged to measure a capacitance value of each capacitor between its measurement electrode(s) and one or more reference electrodes. The use of graphene enables the measurement electrodes to be very thin and closely spaced.

Optionally the measurement system is also arranged to process the capacitance values and thereby infer the liquid level. Alternatively the measurement system may be arranged to transmit them to a remote processor which determines the liquid level.

Where the sensor is immersed in a single liquid only then it can be used to measure the level of the liquid/air transition at the top of the liquid. Where the sensor is immersed in a pool of stratified liquid (for instance fuel and water) then it can be used to measure the level of the liquid/air transition and/or the level of the transition between the various liquid layers (for instance the fuel/water transition).

The sensor may have only a single reference electrode, either in a different plane to the measurement electrodes or in the sample plane as in FIG. 6B of US2012/0065904. However more preferably each capacitor further comprises one or more graphene reference electrodes, and the measurement system is arranged to measure the capacitance value of each capacitor between its graphene measurement electrode(s) and its graphene reference electrode(s).

The measurement and reference electrodes may be arranged side by side in the stack as in FIG. 6A of US2012/0065904, but more preferably the measurement and reference electrodes alternate with each other within the stack. Such an interleaved arrangement enables the stack to be narrower. The use of graphene for the measurement and/or reference electrodes enables the electrodes to be very thin and closely spaced so the length of the stack is not too great despite the interleaved arrangement.

Each capacitor may have only a single pair of electrodes, but more preferably each capacitor comprises a plurality of graphene measurement electrodes and a plurality of graphene reference electrodes which are arranged so that they alternate with each other within the capacitor. The use of graphene enables the electrodes to be very thin and closely spaced so the length of the capacitor is not too great despite the interleaved arrangement.

Preferably the measurement electrodes and/or the reference electrodes comprise reduced graphene oxide.

Preferably the measurement electrodes and/or the reference electrodes are formed in one or more layers of graphene oxide—for instance by thermochemical nanolithography, by applying a reducing agent such as hydrazine monohydrate, or by any other reductive etching method. Graphene oxide, which is an insulator, can be etched directly to form conductive reduced graphene regions with very tight tolerances enabling the electrodes to be placed very close together. The electrodes may be formed in different graphene oxide layers but more typically all of the measurement electrodes and/or all of the reference electrodes in the stack are formed in the same layer of graphene oxide, which may be planar or non-planar.

At least some of the measurement and reference electrodes may be separated by a gap of less than 1 mm ($10^{-3}$ m), less than 100 µm ($10^{-4}$ m), or less than 10 µm ($10^{-5}$ m)—perhaps as low as 1 µm ($10^{-5}$ m). This ensures that the dielectric distance through the liquid is very small and enables a measureable capacitance (>10 pF in air) at each segment.

Similarly at least some of the measurement electrodes and/or at least some of the reference electrodes may have a width less than 1 mm ($10^{-3}$ m), less than 100 µm ($10^{-4}$ m), or less than 10 µm ($10^{-5}$ m)—perhaps as low as 1 µm ($10^{-5}$ m).

The measurement system may be arranged to sequentially or simultaneously measure the capacitance values.

The electrodes may be non-planar but more typically at least the graphene measurement electrodes lie in the same plane. Preferably all of the graphene measurement electrodes in the stack and all of the graphene references electrodes in the stack lie in the same plane.

The sensor may be used to measure a level of any liquid, but preferably it is arranged to measure a level of a liquid (for instance water and/or fuel) in a fuel tank, most typically in a vehicle such as an aircraft, ship or car.

The capacitors are typically installed on the inner wall of the fuel tank. Preferably the fuel tank comprises a wall with an outer surface and an inner surface, the inner surface of the wall contacting fuel in the fuel tank when the system is in use, and the capacitors are embedded within or mounted to the inner surface of the wall.

The electrodes may be coated, or they may be uncoated so that they contact fuel in the fuel tank when the system is in use.

Preferably the graphene measurement and/or reference electrodes are formed in graphene oxide by reductive etching; and then coupled to the measurement system.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
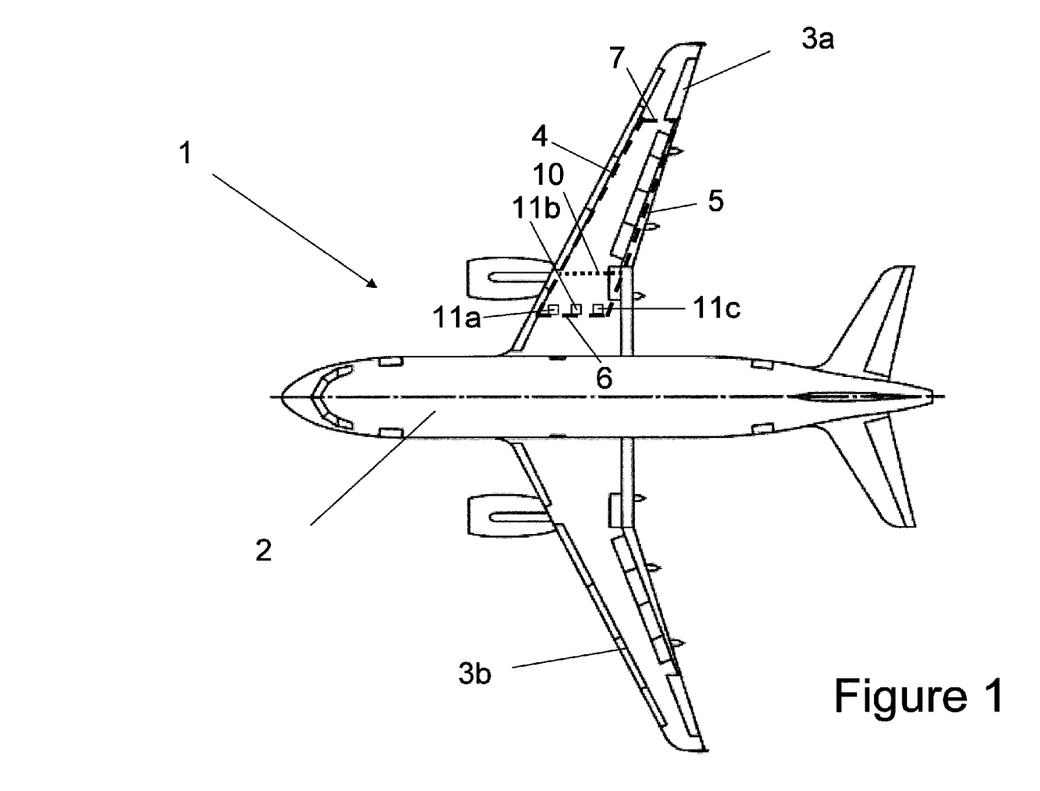
FIG. 1 is a plan view of an aircraft showing schematically the locations of three wing mounted fuel level sensors.

FIG. 1 illustrates an aircraft 1 having a fuselage 2 and wings 3a, 3b. The wing 3a has a wing box which is bounded by front and rear spars 4, 5; inboard and outboard ribs 6, 7; and upper and lower covers 8, 9 (shown in FIG. 2) which together form the walls of a fuel tank. The fuel tank is divided into a number of sub-compartments by baffle ribs which allow fuel to flow between the compartments. One of such compartments is shown in FIG. 2 bounded by the inboard rib 6 and a baffle rib 10.

Figure 2:
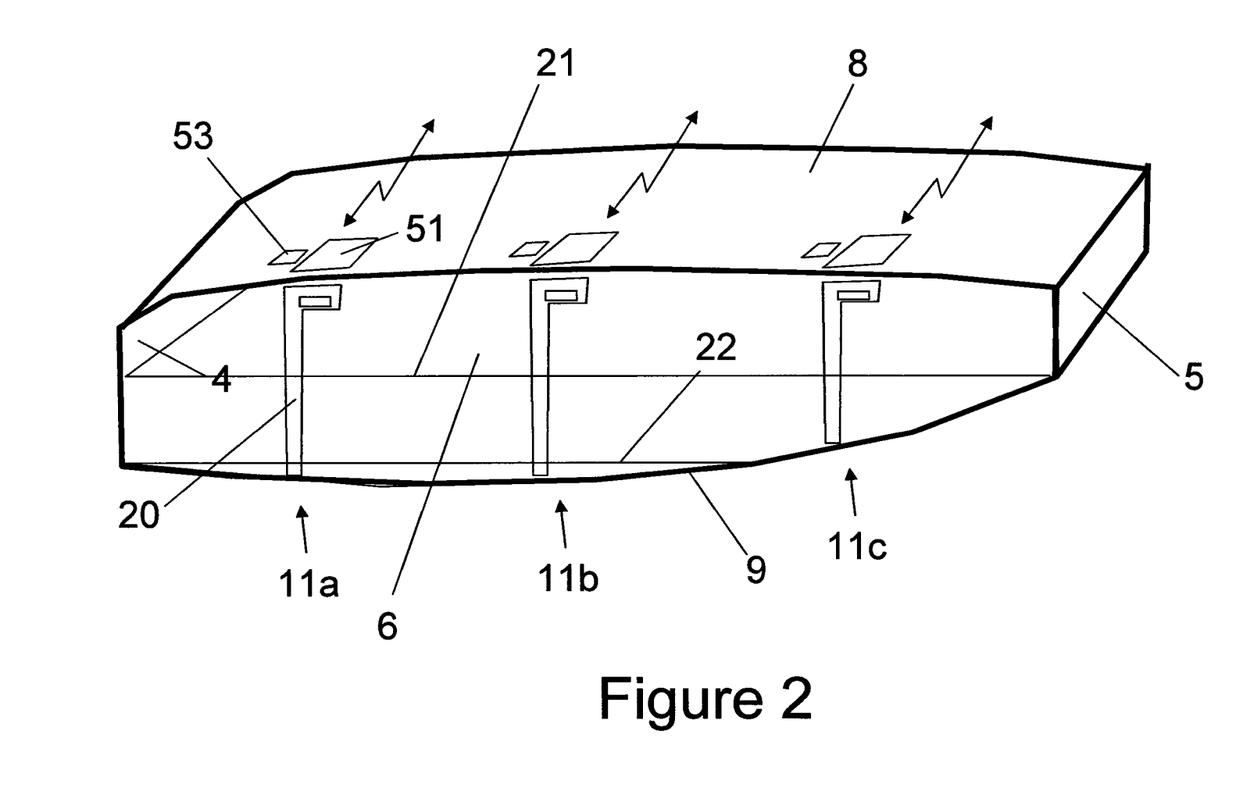
FIG. 2 is an isometric view of part of a fuel tank.

The fuel tank is provided with a plurality of fuel level sensors which are distributed across its extent, three of such sensors 11a-c being shown in FIGS. 1 and 2. It should be noted that the fuel tank has many more of such sensors which are not shown for purposes of clarity. The other sensors may be mounted on other ribs or the spars.

Each sensor 11a-c has an elongate probe 20 which extends vertically from the top to the bottom of the fuel tank. The rib 6 has an outer surface and an inner surface, the inner surface contacting fuel 21 and water 22 in the fuel tank when the fuel tank is full. The probe 20 is mounted on or embedded within the inner surface of the rib 6 and is also in contact with the fuel and water.

Figure 3:
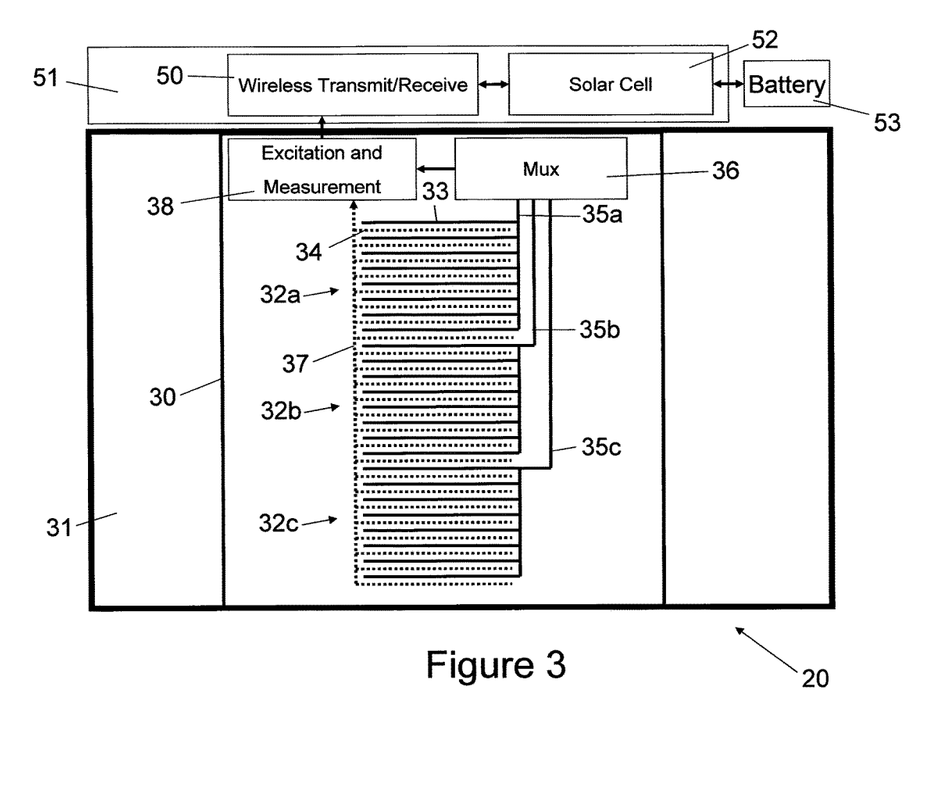
FIG. 3 is a schematic view of a capacitive sensor.

One of the probes 20 is shown in FIG. 3, which is schematic and not to scale. The probe comprises a layer of graphene oxide 30 on a substrate 31. The layer 30 is typically 2 or 3 cm wide. The substrate 31 is mounted on (or embedded within) the inner surface of the rib 6. A stack of capacitors is formed in the graphene oxide layer. Only three capacitors 32a-c in the stack are shown in FIG. 3 for purposes of clarity but in practice the stack will contain many more of such capacitors. Each capacitor comprises a plurality of graphene measurement electrodes 33 and a plurality of graphene reference electrodes 34 which are arranged so that they alternate with each other within the capacitor. So for example the capacitor 32a comprises eight measurement electrodes interleaved with eight reference electrodes (which are shown in dotted lines).

The measurement electrodes of each capacitor are connected in parallel to a respective measurement line 35a-c which is connected in turn to an analogue multiplexer 36. The reference electrodes of all of the capacitors are connected in parallel to a common reference line 37 which is connected in turn to a measurement circuit 38.

Figure 4:
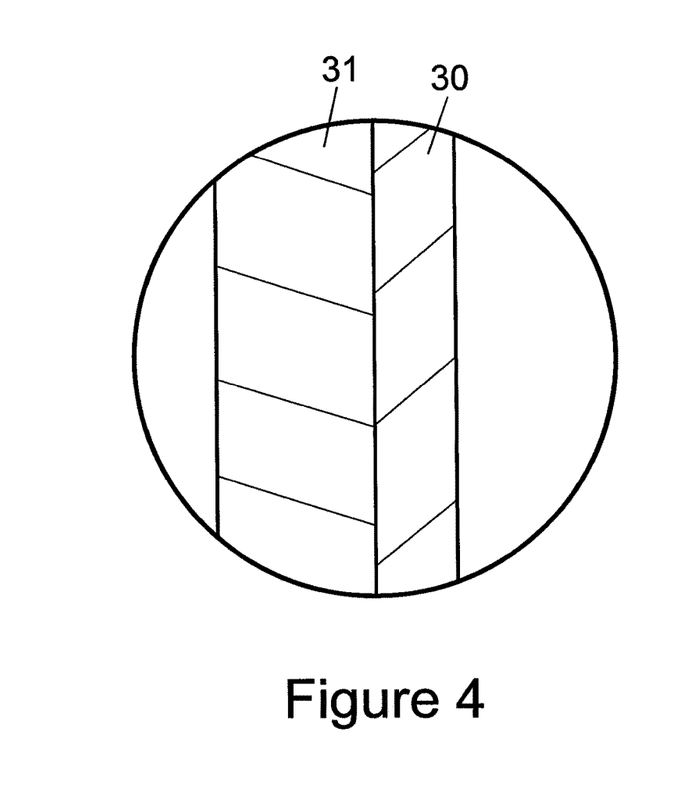
FIG. 4 is an enlarged cross-sectional view through a probe before formation of the graphene electrodes on the graphene oxide substrate.
Figure 5:
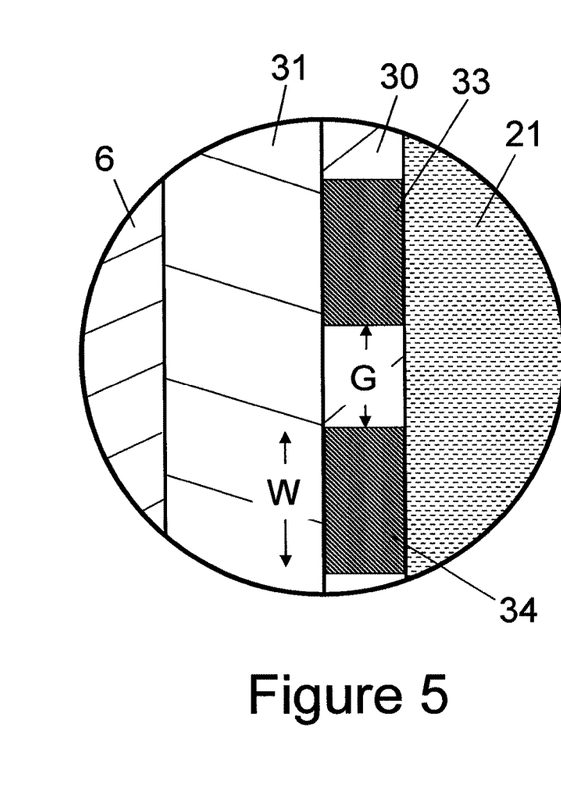
FIG. 5 is an enlarged cross-sectional view through the probe installed in the fuel tank after formation of the graphene electrodes on the graphene oxide substrate.

FIG. 4 is an enlarged cross-sectional view through the probe showing the graphene oxide layer 30 on the substrate 31 before formation of the graphene electrodes. FIG. 4 is not to scale—the graphene oxide layer 30 is much thinner than the substrate 31 in practice (in fact it is typically a single molecule in depth). FIG. 5 is an enlarged cross-sectional view through the probe installed in the fuel tank after formation of the graphene electrodes (also not to scale) by reductive etching.

A suitable process for formation of the graphene electrodes is thermochemical nanolithography as described in Wei. Z. et al., Nanoscale Tunable Reduction of Graphene Oxide for Graphene Electronics, Science Vol. 328, 11 Jun. 2010, 1373-1376 [DOI:10.1126/science.1188119]. A fine probe with a tip heated to a temperature over 130° C. is used to strip off the oxygen molecules from the single layered graphene oxide molecular lattice to leave a line of reduced graphene oxide (i.e. graphene). FIG. 5 shows one measurement electrode 33 and one adjacent reference electrode 34 etched in the layer 30. The width W of the electrodes is equal, and typically in the range of 1 mm to 1 µm, or even less. The adjacent electrodes are separated by a gap G which is less than 1 mm and preferably the smallest possible compatible with the need to avoid voltage breakdown. Etched graphene oxide enables such a small gap to be accurately controlled which enables each capacitor to have a high capacitance (dry capacitance >20 pF) and withstand a high voltage (>20V).

Graphene also has the advantages of being lightweight, strong, and of high electrical conductivity. It can also be doped to provide transistor and electronic functions.

The graphene oxide layer 30 is deposited on a planar surface of the substrate 31 so the layer 30 is also planar. As can be seen in FIG. 5, the adjacent electrodes 33, 34 lie in the same plane, as do all of the other electrodes in the stack.

Figure 6:
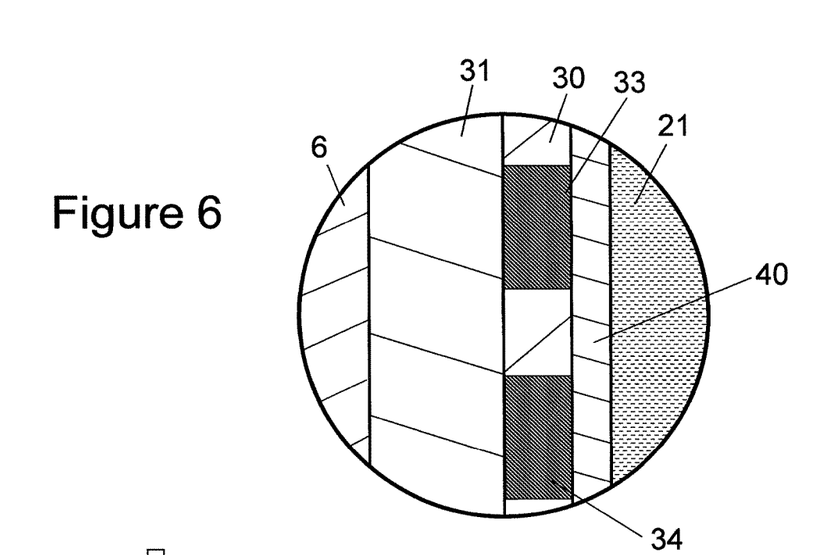
FIG. 6 is an enlarged cross-sectional view of a coated probe.

FIG. 5 shows fuel 21 contacting the graphene electrodes 33, 34. This provides the advantage that the sensor can be used to measure the electrical resistance of the fuel as well as its level. The use of graphene and graphene oxide is advantageous in this case since it does not suffer from galvanic corrosion, unlike a metal. In the alternative embodiment of FIG. 6 the electrodes are coated with a micron thickness lacquer 40 so they do not contact the fuel 21. Coating the electrodes as in FIG. 6 has the advantage of preventing contamination.

Referring back to FIG. 3—the multiplexer 36 and reference line 37 are connected to an excitation and measurement circuit 38 which is arranged to measure the capacitance between its two inputs. Thus when the line 35a is connected to the circuit 38 by the multiplexer 36 then the circuit 38 measures the capacitance of the capacitor 32a, when the line 35b is connected to the circuit 38 by the multiplexer 36 then the circuit 38 measures the capacitance of the capacitor 32b, and so on.

The multiplexer 36 switches sequentially from the lowest capacitor in the stack to the capacitor 32a at the top of the stack. The resulting series of capacitance values can then be used to infer the level of the fuel 21 and the level of the water 22 as described below with reference to FIG. 7, which is a graph illustrating two series of capacitance values A0 to AN, where N is the total number of capacitors in the stack (typically N=127 providing a fuel level resolution better than 1%).

Each capacitor returns a capacitance value of An (n=1, 2, 3 ... N) for a specific time interval "t". A reference capacitor (not shown) with a known capacitance Aref of the order of 100 pF is also provided, and its capacitance is also measured and labeled A0 in FIG. 7. As can be see in FIG. 7, the reference capacitance Aref=A0 (at T0) is the highest. The capacitance value A1 of the completely water immersed capacitance value is lower by design. The capacitance value A2 of the next capacitor is slightly lower still because it is partially immersed in fuel, which has a lower dielectric constant than water. The capacitances A3, A4, A5 of the next three capacitors are equal as they are all immersed in fuel. The capacitance value A6 of the next capacitor is slightly lower because it is only partially immersed in fuel, and the capacitance value of the remaining capacitors A7 to AN is lower still because the dielectric constant of air is lower than that of fuel. As can be seen, the cycle repeats starting with the reference capacitance Aref=A0 at T0.

Figure 7:
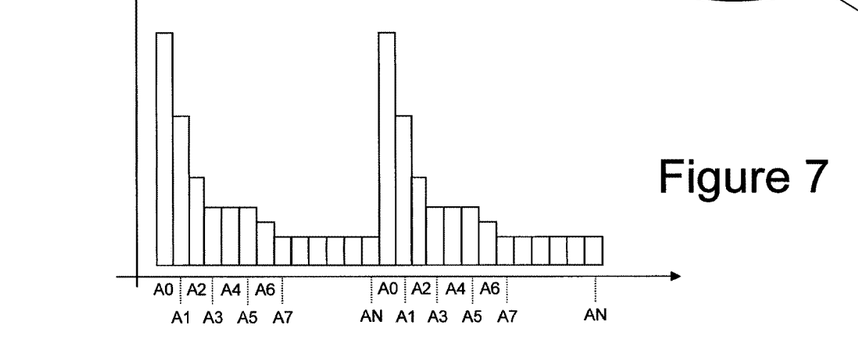
FIG. 7 shows two sequences of capacitance values where the leftmost values are measurements from the bottom of the tank (perhaps in water), the next set are in fuel, and the rightmost are in air.

The height of the probe 20 is known=Hp. The fuel and/or water level can be estimated by detecting a change in the capacitance value at a specific time. The complete cycle takes time Tp=(N+1)*t. The time at which the capacitance value changes from water to fuel (indicated by a drop in capacitance at A2) is denoted as Tw. Therefore the water height can be calculated as Hw=Hp*(Tw/Tp).

The time at which the capacitance value changes from water to fuel (indicated by a drop in capacitance at A6) is denoted as Tf. Therefore the fuel height can be calculated as Hf=Hp*(Tf/Tp).

Further details of how the fuel and/or water level can be inferred from the capacitance values is given in US-A-2012/0065904, the contents of which are incorporated herein by reference.

The multiplexer 36 and circuit 38 may be doped and etched into the same graphene oxide layer 30 as the capacitors. Alternatively they may be formed by more conventional embedded processors, either FPGA or ASIC. Referring to FIGS. 2 and 3, the circuit 38 outputs the capacitance values to a wireless transmitter/receiver circuit 50 which is etched onto a graphene oxide substrate 51 on the upper cover 8. The circuit 50 transmits the data to a remote receiver (typically in the fuselage 2) as described in detail in US-A-2013/0269421, the contents of which are incorporated herein by reference. Optionally the circuit 38 is programmed to process the capacitance values and thereby infer the liquid level—alternatively it may transmit them to a remote processor which determines the liquid level.

A solar energy collector cell 52 is also doped and etched onto the same graphene oxide substrate 51 and powers the circuit 38, multiplexer 36 and transmitter/receiver circuit 50. The solar cell 52 is connected to a battery 53 which is external to the fuel tank and safely vented to the atmosphere. The battery provides power when solar power is not available.

Figure 8:
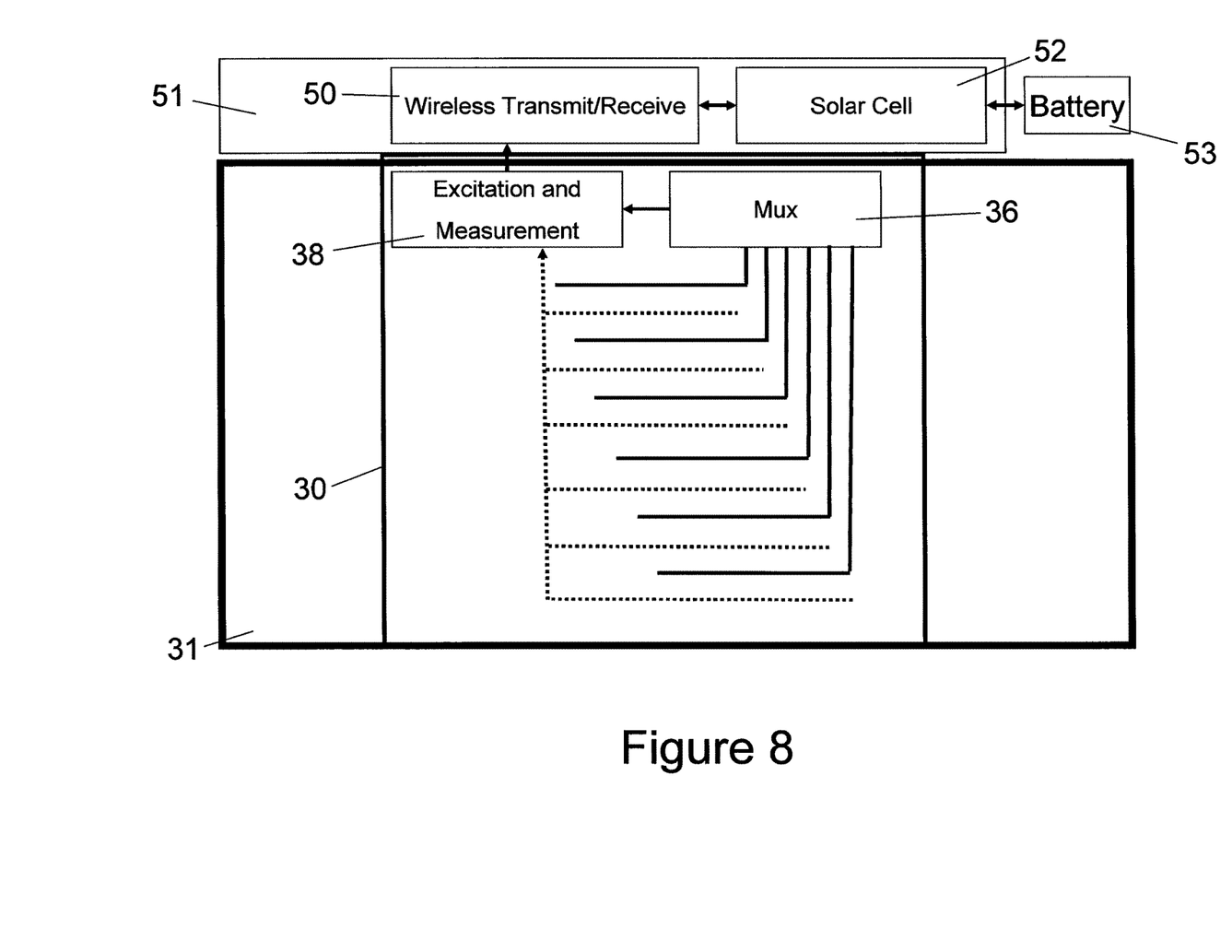
FIG. 8 shows a first alternative sensor.

FIG. 8 shows an alternative embodiment in which each capacitor has only a single measurement electrode and a single reference electrode. Thus the capacitors are arranged with the measurement and reference electrodes alternating with each other within the stack but not within each electrode.

Figure 9:
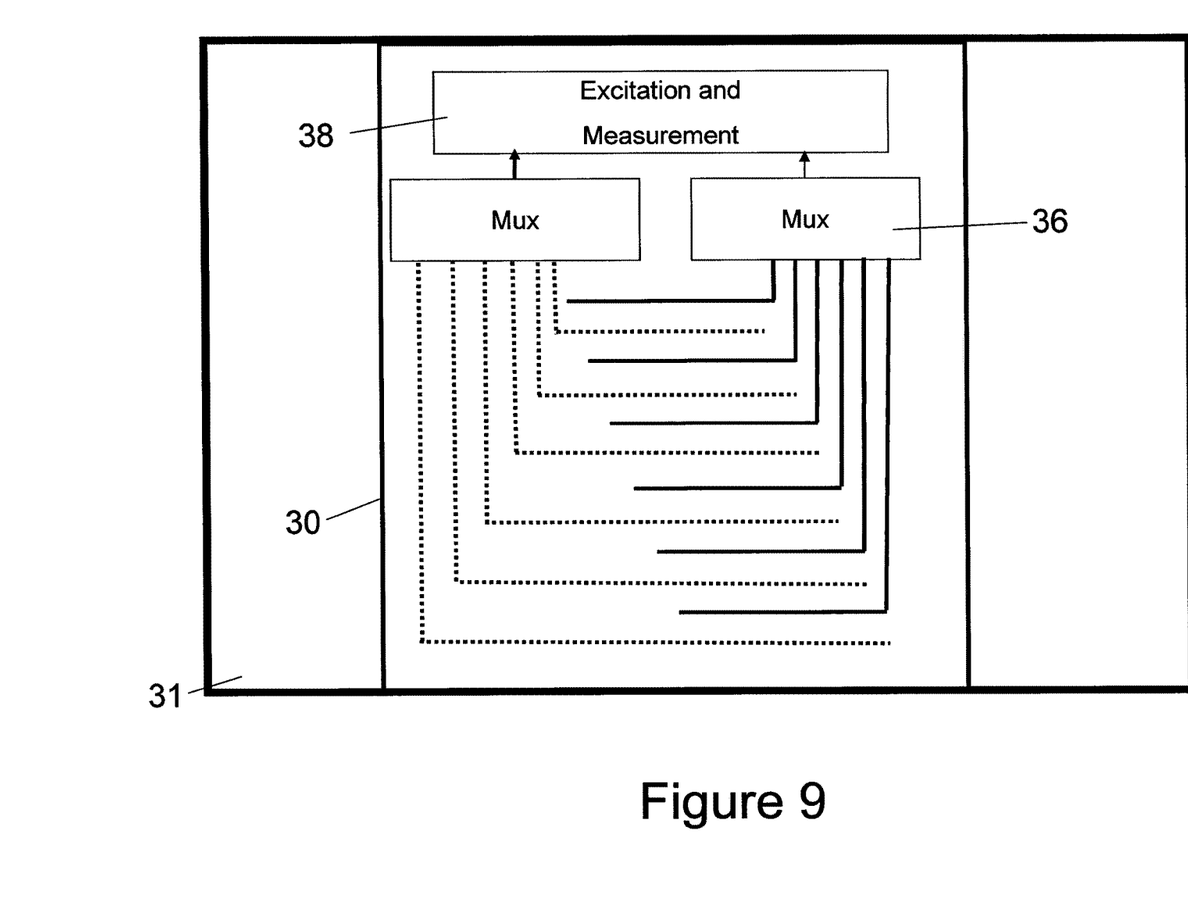
FIG. 9 shows a second alternative sensor.

FIG. 9 shows another alternative embodiment in which the reference electrodes are connected independently to a second multiplexer rather than a common bus 37 as in the embodiment of FIG. 3.

Although the invention has been described above with reference to one or more preferred embodiments, it will be appreciated that various changes or modifications may be made without departing from the scope of the invention as defined in the appended claims.

The invention claimed is:

1. A fuel tank system comprising a fuel tank; and a capacitive sensor arranged to measure a level of a liquid in the fuel tank, comprising:
a stack of capacitors, each capacitor comprising one or more graphene measurement electrodes;
a measurement system arranged to measure a capacitance of each capacitor between its measurement electrode(s) and one or more reference electrodes to generate a series of capacitance values; and
a layer of graphene oxide,
wherein all of the graphene measurement electrodes in the stack are in the layer of graphene oxide, the graphene reference electrodes are formed in the same layer of graphene oxide as the graphene measurement electrodes, the graphene reference electrodes comprise reduced graphene oxide, one of the graphene measurement electrodes and one of the graphene reference electrodes are adjacent electrodes separated by a gap between the adjacent electrodes, the gap between the adjacent electrodes contains graphene oxide, the graphene measurement electrodes comprise reduced graphene oxide, and the sensor is configured to be at least partially immersed in the liquid so that the series of capacitance values can be used to determine the level of the liquid; and,
wherein the capacitors are installed within and attached to the fuel tank.

2. The fuel tank system of claim 1 wherein all of the graphene measurement electrodes in the stack lie in the same plane.

3. The fuel tank system of claim 1 wherein each capacitor further comprises one or more graphene reference electrodes, and the measurement system is arranged to measure the capacitance of each capacitor between its graphene measurement electrode(s) and its graphene reference electrode(s).

4. The fuel tank system of claim 3 wherein all of the graphene measurement electrodes and all of the reference electrodes in the stack are formed in the layer of graphene oxide.

5. The fuel tank system of claim 3 wherein each capacitor comprises a plurality of graphene measurement electrodes and a plurality of graphene reference electrodes which are arranged so that they alternate with each other within the capacitor.

6. The fuel tank system of claim 3 wherein at least some of the graphene measurement and graphene reference electrodes are separated by a gap of less than 100 μm ($10^{-4}$ m).

7. The fuel tank system of claim 3 wherein each capacitor comprises one or more graphene measurement electrodes and one or more graphene reference electrodes which lie in the same plane.

8. The fuel tank system of claim 7 wherein each graphene measurement electrode and each graphene reference electrode in the stack lie in the same plane.

9. The fuel tank system of claim 3, wherein at least some of the measurement and reference electrodes are separated by a gap of less than 10 μm ($10^{-5}$ m).

10. The fuel tank system of claim 1 wherein the measurement system is arranged to sequentially measure the capacitance values.

11. The fuel tank system of claim 1 wherein the graphene reference electrodes comprise reduced graphene oxide formed in the same layer of graphene oxide as the graphene measurement electrodes.

12. The system of claim 1 wherein the graphene measurement and reference electrodes are uncoated so that they contact fuel in the fuel tank when the system is in use.

13. A vehicle comprising a fuel tank system according to claim 1.

14. A vehicle according to claim 13 wherein the vehicle is an aircraft.

15. A method of manufacturing the capacitive sensor of claim 1, the method comprising forming the graphene measurement electrodes and the graphene reference electrodes in a layer of graphene oxide by reductive etching; and coupling them to the measurement system, wherein said reductive etching comprises applying a reducing agent to the layer of graphene oxide to chemically reduce the graphene oxide to graphene, or wherein said reductive etching comprises a thermochemical nanolithography process in which a heated probe is used to strip off oxygen molecules from the layer of graphene oxide.

16. The fuel tank system of claim 1, wherein at least some of the graphene measurement electrodes have a width less than 1 mm ($10^{-3}$ m).

17. The fuel tank system of claim 1, wherein at least some of the graphene measurement electrodes have a width less than 100 μm ($10^{-4}$ m).

18. The fuel tank system of claim 1, wherein at least some of the graphene measurement electrodes have a width less than 10 μm ($10^{-5}$ m).

* * * * *